(12) United States Patent
Kelley et al.

(10) Patent No.: US 9,079,778 B2
(45) Date of Patent: Jul. 14, 2015

(54) PRODUCTION OF NEAR-STOICHIOMETRIC SPHERICAL TUNGSTEN CARBIDE PARTICLES (71) Applicant: Kennametal Inc., Latrobe, PA (US)

(72) Inventors: Harold Edward Kelley, Fallon, NV (US); Pankaj K. Mehrotra, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 29 days.

(21) Appl. No.: 13/840,037

(22) Filed: Mar. 15, 2013

(65) Prior Publication Data

US 2014/0272415 A1  Sep. 18, 2014

(51) Int. Cl.
C01B 31/34 (2006.01)

(52) U.S. Cl.
CPC ........... *C01B 31/34* (2013.01); *Y10T 428/2982* (2015.01)

(58) Field of Classification Search
CPC ................ C01B 31/34; Y10T 428/2982
USPC ................ 427/212, 215, 227, 228; 428/403; 423/440; 501/87
See application file for complete search history.

(56) References Cited

U.S. PATENT DOCUMENTS

| 6,641,918 | B1* | 11/2003 | Sherman et al. | 428/403 |
| 8,178,477 | B2* | 5/2012 | Skala et al. | 507/269 |
| 8,753,720 | B2* | 6/2014 | Zinn | 427/376.1 |
| 2012/0315722 | A1* | 12/2012 | Robinson et al. | 438/95 |
| 2014/0272415 | A1* | 9/2014 | Kelley et al. | 428/402 |

OTHER PUBLICATIONS

Tekna Advanced Materials Inc., product data sheet for Tekmat WC spherical cast tungsten carbide powder, http://www.tekna.com/powder/spherical-powder/tungsten-carbide.html, 2009.
Technogenia, product data sheet for LaserCarb process, http://www.technogeniausa.com/lasercarb.html, Jun. 25, 2014.

* cited by examiner

*Primary Examiner* — Leszek Kiliman
(74) *Attorney, Agent, or Firm* — Matthew W. Gordon (57) ABSTRACT Near-stoichiometric spherical tungsten carbide particles and a method for making near-stoichiometric spherical tungsten carbide particles are disclosed. The method of making these particles may comprise coating a starting powder with a carbon containing compound followed by plasma processing the starting powder in a plasma formed by known ionization techniques using a suitable fluid medium. The near-stoichiometric spherical tungsten carbide particles exhibit desirable particle uniformity, impact resistance, and wear resistance in a variety of applications.

11 Claims, 9 Drawing Sheets

PRODUCTION OF NEAR-STOICHIOMETRIC SPHERICAL TUNGSTEN CARBIDE PARTICLES

FIELD OF THE INVENTION

The present invention relates to tungsten carbide powders, and more particularly relates to the production of near-stoichiometric spherical tungsten carbide particles for use in various wear resistant applications.

BACKGROUND INFORMATION

In their as received condition, most tungsten carbide powders tend to be irregular in shape, depending on the crystal structure, morphology and the specific method of their production. Plasma processing of tungsten carbide powders has been known to produce spherical particles. In the plasma process, the as-received powder is passed through a high-temperature plasma generated by known ionization techniques using a suitable fluid medium. The high temperatures generated in the plasma cause local or complete melting of the starting tungsten carbide particles, leading to partial or complete spherical shapes. However, the resulting spherical particles may have different compositions compared to the starting tungsten carbide composition. For example, WC is known to lose C and convert to a mixture of WC and $W_2C$ as a result of plasma treatment in a neutral gas such as Ar or He. Such decarburization can have deleterious effects both in the properties of the resultant WC powder and when the WC powder is combined with Co to make a WC—Co composite material. For example, $W_2C$ may be softer than WC, and the resulting carbon deficient WC—Co compositions may be more brittle. Current processes for plasma treating WC powder are therefore disadvantageous because they produce carbon-deficient WC.

SUMMARY OF THE INVENTION

The present invention provides near-stoichiometric spherical tungsten carbide particles and a method for making near-stoichiometric spherical tungsten carbide particles are disclosed. The near-stoichiometric spherical tungsten carbide particles exhibit desirable particle uniformity, impact resistance, and wear resistance in a variety of applications.

An aspect of the present invention is to provide a method of producing substantially spherical tungsten carbide particles. The method comprises coating a starting powder comprising non-spherical stoichiometric WC particles with a carbon-containing compound, and heating the coated stoichiometric WC particles in the presence of a plasma to produce the substantially spherical tungsten carbide particles.

Another aspect of the present invention is to provide a method of producing substantially spherical tungsten carbide particles. The method comprises heating coated non-spherical tungsten carbide particles coated with a carbon-containing compound in a plasma-containing chamber to produce the substantially spherical tungsten carbide particles.

A further aspect of the present invention is to provide a hard carbide powder comprising substantially spherical, near-stoichiometric tungsten carbide particles, wherein the substantially spherical tungsten carbide particles comprise $WC_{1-x}$, where x ranges from 0.001 to 0.25.

These and other aspects of the present invention will be more apparent from the following description.

DETAILED DESCRIPTION

The present invention provides for the production of substantially spherical tungsten carbide powders comprising nearly stoichiometric WC. As used herein, the term "substantially spherical" refers to substantially equiaxed particles with rounded shapes that are non-faceted or substantially free of sharp corners. In certain embodiments, the substantially spherical powders typically have an average aspect ratio of less than 3:1 or 2:1, for example, an aspect ratio less than 1.5:1, or less than 1.2:1. In a certain embodiment, substantially spherical particles may have an aspect ratio of about 1:1.

In accordance with embodiments of the present invention, starting powders in the form of WC-based feed stock are coated with a carbon-containing compound which decomposes and provides a source of carbon during the plasma treatment process, leading to non-carbon deficient WC or a mix of WC and $W_2C$ with a significantly reduced amount of $W_2C$ in comparison with conventional plasma treated powders. The near-stoichiometric WC may be represented by the formula $WC_{1-x}$, where x is typically from 0.001 to 0.25, for example from 0.01 to 0.2, or from 0.05 to 0.15. In certain embodiments, x may be less than 0.1, or less than 0.08.

Other carbide powders could be plasma treated in the presence of wax or other C bearing compounds to maintain C balance. Similarly, nitride powders could be plasma treated in the presence of N bearing compounds to maintain N balance.

One example of an application for near-stoichiometric spherical tungsten carbide particles may include thermal spray coating feedstock. Currently, $WC+W_2C$ powders are available in the spherical form, and due to their morphology, are preferred as feed stock for thermal spray coating since they can have superior flow as compared to irregularly shaped powder. A non-carbon deficient spherical WC powder may be preferred over convential plasma treated powders due to its stoichiometry.

Another example of an application for near-stoichiometric spherical tungsten carbide particles may include raw material for WC—Co based hardmetal. Spherical non-carbon deficient WC powder may be used to make WC—Co based hardmetal by mixing and smearing Co on the WC powder. Such a powder should have superior flow compared to the conventional powder, should allow for a better control of pressed part weight and dimensions, and should also allow for increased production rates on the presses. Any retained spherical shape of the WC grains in the sintered product could also increase toughness of the sintered hardmetal, since it will minimize stress concentration which may occur at sharp corners of irregular grains. Such a powder could also be used as a better flowing feed for thermal spray coating.

A further possible application may include non-carbon deficient spherical WC in combination with spherical Co powders. Similar to WC powders, Co powders can be plasma treated to make them spherical. Spherical WC and spherical Co powders should mix more efficiently than irregularly shaped powders, and thus provide a more uniform powder and sintered compact in terms of composition, properties, and dimensional control. Such a powder may also provide superior flow, resulting in better green part weight, size control, and pressing rate. Furthermore, this powder could also be used as a better flowing feed for thermal spray coating. Additionally, these powders could be mixed with carbides, nitrides or mixtures of Ti, Ta, Nb, Zr, Hf, Cr, V, or similar materials, such as cubic carbides/nitrides, which are commonly used in the hardmetal and thermal spray coating industries.

A further potential application may include non-carbon deficient spherical WC in combination with spherical cubic carbide/nitrides in further combination with spherical Co powders. Similar to WC and Co powders, cubic carbides/nitride powders may be plasma treated to make spherical particles. When combined with spherical or conventional WC and Co, powders, these powders should mix more efficiently than irregularly shaped powders, and thus provide a more uniform powder and sintered compact in terms of composition, properties and dimensional control. Such a powder could also be used as a better flowing feed for thermal spray coating. Any retained spherical shape of the cubic carbide grains in the sintered product could also increase toughness of the sintered hardmetal, since it will minimize stress concentration which may occur at sharp corners of irregular grains.

Figure 3:
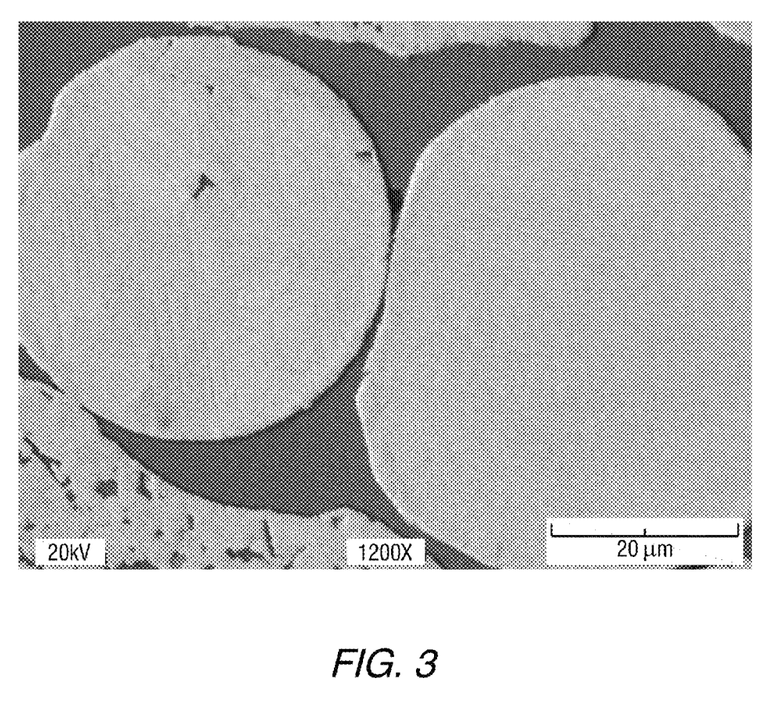
FIG. 3 is a higher magnification of the FIG. 2 photomicrograph taken at 1200×.

An additional application for non-carbon deficient spherical WC may include the use of spherical WC in matrix powder applications and hardfacing applications. It has been shown that hard spherical particles can provide better wear resistance in some applications. Also, the improved packing density can cause better infiltration leading to better strengths of the composite materials. Spherical cast carbide (WC/$W_2C$) has been used for several years in similar applications with distinct improvements. Since WC is a single component, it should demonstrate improved properties, as improved properties are typically seen from crystalline WC over irregularly shaped cast carbide. A scanning electron microscope photomicrograph at high magnification is shown in FIG. 3.

The following examples are intended to illustrate various aspects of the invention, and are not intended to limit the scope of the invention.

EXAMPLES

Tungsten carbide particles produced from non-coated and wax-coated faceted WC starting powders that were subjected to a plasma treatment process are shown in Table 1. The wax was paraffin wax applied by first dissolving it in an organic liquid, mixing it with the carbide powder and then evaporating the organic liquid, which leaves a thin coating of wax on the powder. Particles were processed through induction plasma in a neutral atmosphere.

TABLE 1

| Powder | Carbon (wt %) | Phases by XRD, relative |
|---|---|---|
| WX001-as received (no wax) | 6.27 | WC |
| WX001-plasma treated (no wax) | 3.89 | 34% WC, 57% $W_2C$, 8% C |
| WCA50BL-as received (no wax) | 6.19 | WC |
| WCA50BL-plasma treated (no wax) | 4.73 | 41% WC, 54% $W_2C$, 5% C |
| K313X03-as received (with wax) WC-6%Co-0.4%Cr | 5.97 | WC, Co |
| K313X03-plasma treated (with wax) WC-6%Co-0.4%Cr | 6.04 | 80% WC, 20% $W_2C$ |
| K3070WO-as received (with 2% wax) WC-10%Co | 5.7 | WC, Co, $W_2C$ |
| K3070WO-plasma treated (with 2% wax) WC-10%Co | 5.8 | 39% WC, 55% $W_2C$, 5% C |

Example 1

A 25% addition of the spherical WC was added to the standard P90 matrix powder and tested for impact strength. The results are shown in Table 2.

TABLE 2

Impact strength of 25% spherical WC added to standard P90 Matrix Powder

| Impact Test | WX001 | P90 |
|---|---|---|
| #1 | 3.45 ft-lbs | 2.7 ft-lbs |
| #2 | 2.68 ft-lbs | 2.7 ft-lbs |
| Average | 3.1 ft-lbs | 2.7 ft-lbs |

The spherical WC should also show better properties in hardfacing applications especially for the oil and gas industry.

Example 2

Three samples of spherical carbides were submitted for analysis. The samples were labeled as WX001 Batch: 050614-1 Type: 14795, TEKNA WC Batch: 05 TEKNA-WC1 Type: 140-400 Mesh and W3070W02 Batch: 050609-4 Type: 14797. These samples represent spherical macrocrystalline WC, spherical cast carbide and spherical WCCo respectively. The spherical cast carbide is a standard product. The powders properties, chemistries and microstructures were then studied. Optical metallography and scanning electron microscopy (SEM) were then used to examine the microstructures of the spherical carbides.

A sieve analysis was performed to determine the particle size. The results of this analysis are listed in Table 3.

TABLE 3

Sieve Analysis

| Mesh Size | WX001 | TEKNA WC | W3070W02 |
|---|---|---|---|
| +80 | 0% | 0% | 0% |
| −80 + 120 | 0% | 0% | 1.0% |
| −120 + 170 | 0.1% | 43.2% | 8.0% |
| −170 + 200 | 2.7% | 44.3% | 10.7% |
| −200 + 230 | 11.3% | 9.0% | 9.7% |
| −230 + 325 | 50.4% | 3.5% | 22.4% |
| −325 | 35.5% | 0% | 48.2% |

The chemistries for the three powders are given in Table 4.

TABLE 4

Chemistries for the Three Spherical Carbides

| Element | WX001 | TEKNA WC | W3070W02 |
|---|---|---|---|
| Total Carbon | 5.32% | 3.66% | 5.81% |
| Cobalt | <0.05% | <0.05% | 8.6% |
| Chromium | <0.05% | <0.05% | <0.05% |
| Iron | 0.12% | 0.18% | 0.05% |
| Nickel | <0.05% | <0.05% | <0.05% |
| Niobium | 0.06% | <0.05% | <0.05% |
| Tantalum | 0.05% | <0.05% | <0.05% |
| Titanium | 0.07% | <0.05% | <0.05% |
| Vanadium | <0.05% | <0.05% | <0.05% |

Figure 1:
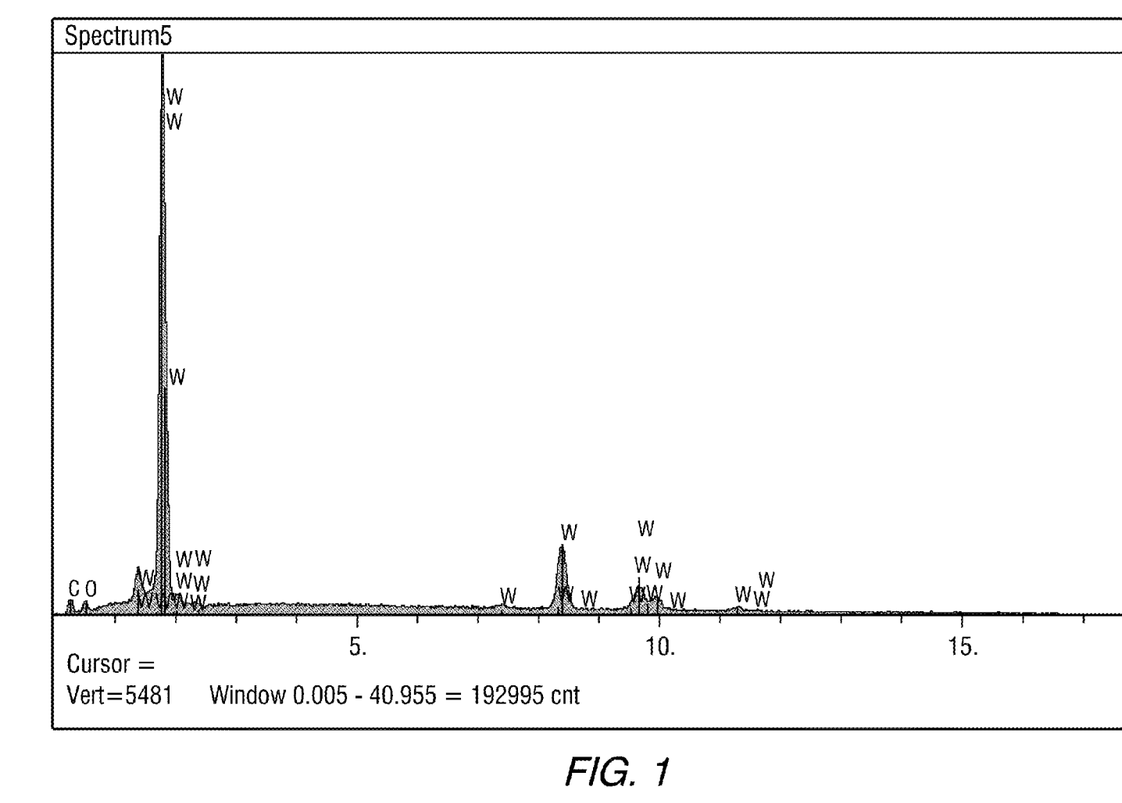
FIG. 1 is an X-ray spectrum of substantially spherical WC powder produced in accordance with an embodiment of the present invention.

The microstructure of the carbide was examined optically and with the SEM. An energy dispersive X-ray system (EDS) was also used with the SEM to do qualitative analysis of the carbide particles. A spectrum of the WX001 is provided in FIG. 1.

Figure 2:
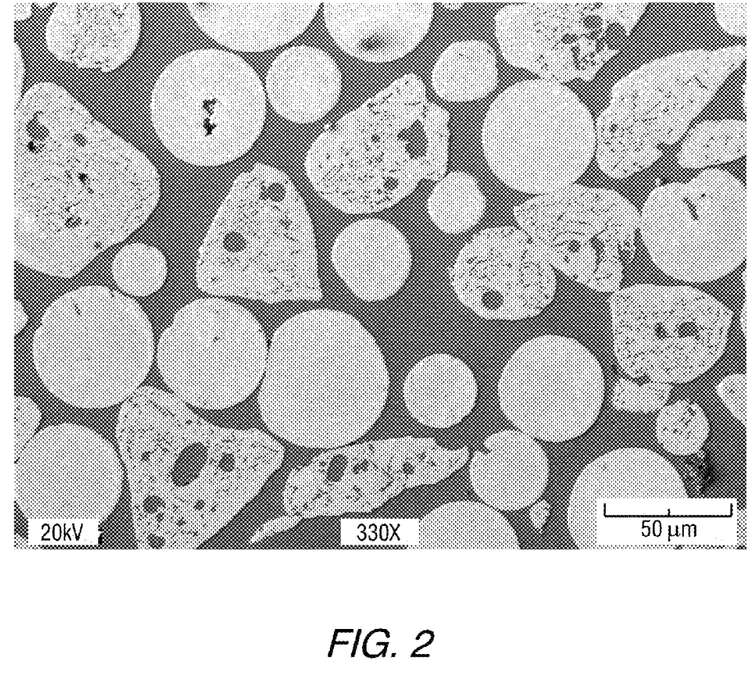
FIG. 2 is a low magnification photomicrograph of substantially spherical WC from a polished section of an infiltrated pin.

FIG. 2 is a low magnification photomicrograph of the spherical WCX001 from a polished section of infiltrated pin.

FIG. 3 is a higher magnification photomicrograph taken at 1200×.

Figure 4:
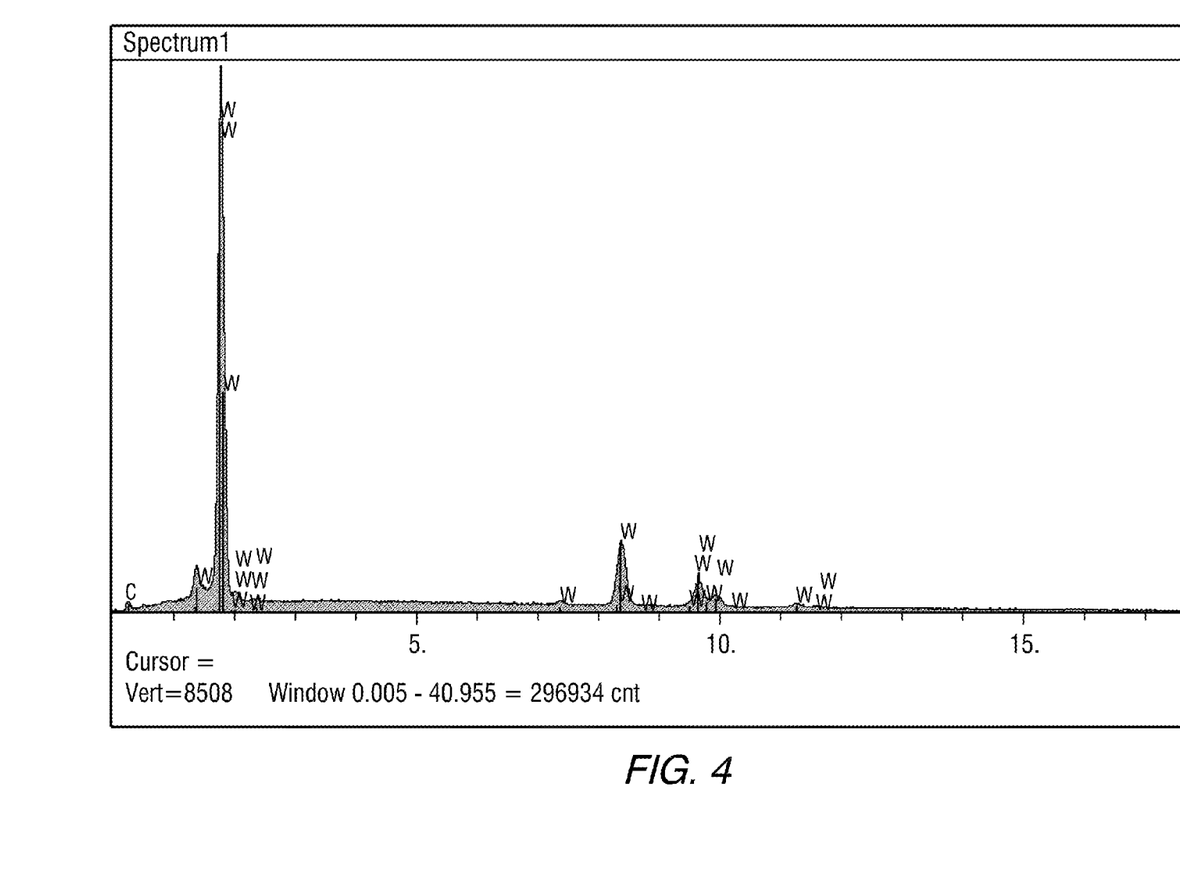
FIG. 4 is an X-ray spectrum of a WC cast carbide.

FIG. 4 is a spectrum of the TEKNA WC (cast carbide).

Figure 5:
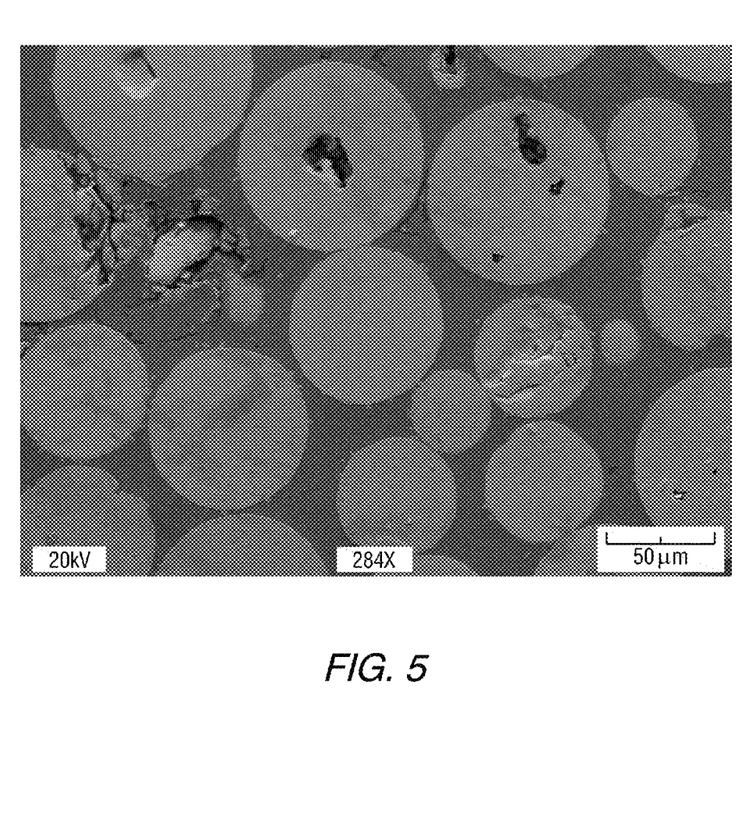
FIG. 5 is a low magnification photomicrograph of infiltrated WC.

FIG. 5 is a low magnification photomicrograph of the TEKNA WC infiltrated polished section.

Figure 6:
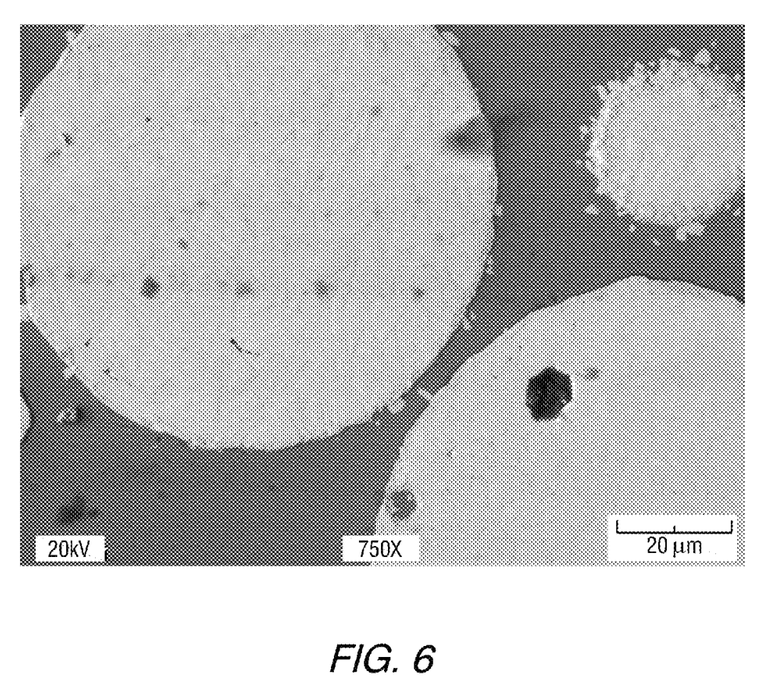
FIG. 6 is a higher magnification of the FIG. 5 photomicrograph taken at 750×.

FIG. 6 is a higher magnification photomicrograph taken at 750×.

Figure 7:
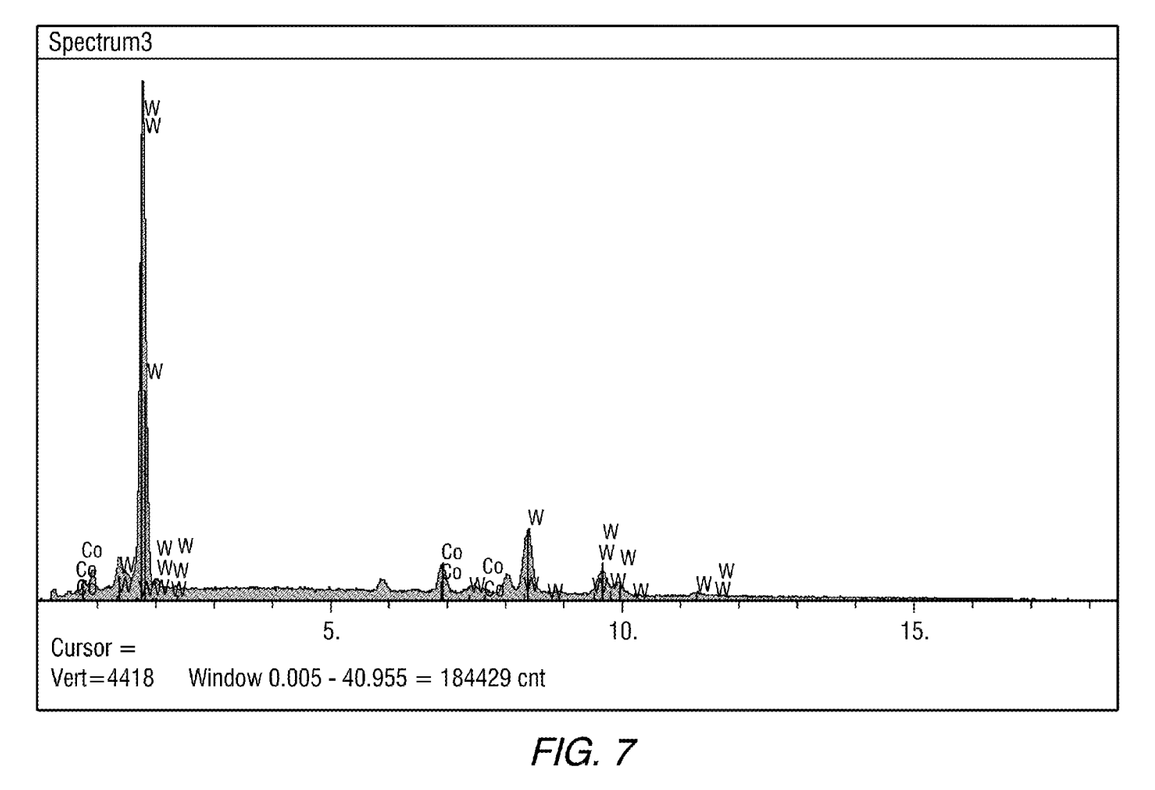
FIG. 7 is an EDS spectrum of cemented carbide particles.

FIG. 7 is the EDS spectrum of the cemented carbide particles labeled as W3070W02.

Figure 8:
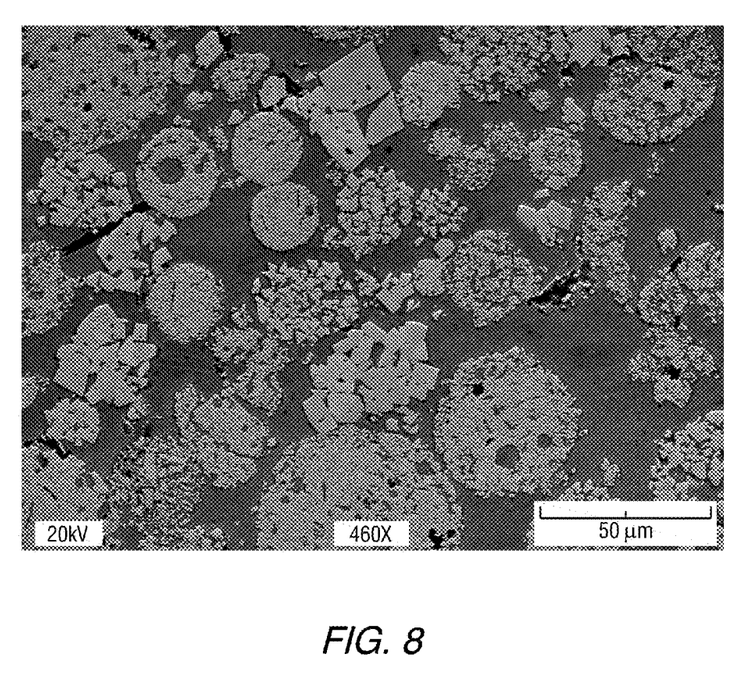
FIG. 8 is a low magnification photomicrograph of the cemented carbide particles.

FIG. 8 is a low magnification photomicrograph of the W3070W02 taken at 460×.

Figure 9:
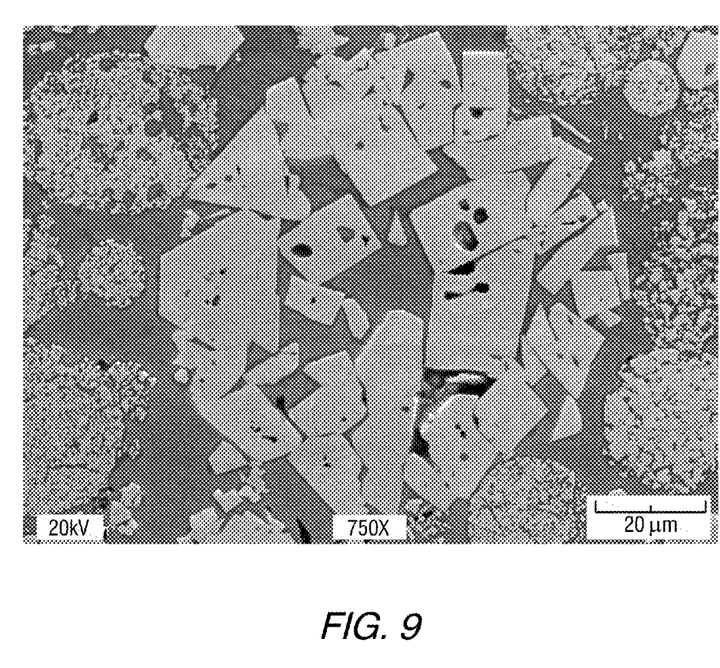
FIG. 9 is a higher magnification of the FIG. 8 photomicrograph of the cemented carbide.

FIG. 9 is a higher magnification photomicrograph of the W3070W02 cemented carbide from a polished infiltrated pin.

The three spherical powders were tested as matrix powders by infiltrating pins for impact testing. In order accommodate non-standard powder size in relation to typical matrix powder, a mix of 25% by weight of each powder with 75% P90 was infiltrated. The pins were then tested for impact. A typical P90 pin gives 2.7 ft-lbs of impact strength when broken with an Instron Dynatup drop tower. The results of these tests are shown in Table 5.

TABLE 5

Impact Strength Test Results for Spherical Carbide Pins

| Impact Test | WX001 | TEKNA WC | W3070W02 |
|---|---|---|---|
| #1 | 3.45 ft-lbs | 2.11 ft-lbs | 3.37 ft-lbs |
| #2 | 2.68 ft-lbs | 2.42 ft-lbs | 3.20 ft-lbs |
| Average | 3.1 ft-lbs | 2.3 ft-lbs | 3.3 ft-lbs |

All three powders show some variation in particle chemistries and microstructure. The WCX001 shows some de-carburization as can be seen by the irregularly shaped particles in FIG. 2. De-carburization is also apparent from the chemical makeup, as the total carbon is about 0.8% lower than stoichiometric. The particles include WC and demonstrate very good spherical shape. The cast carbide, which is a more standard product, is more consistent in particle shape and microstructure. The WC/W$_2$C phases show some variation in grain fineness. Some of the spheres show the very fine feathery structure while others show coarse grain structures. This is common in normal cast carbide, and is due to the speed of cooling. The cemented carbide W3070W02 shows the most variation in WC grain growth, in addition to a higher degree of randomness in particle shape and structure. Some variation of this nature may be attributed to the starting material, which is likely to be crushed scrap. Crushed scrap can have various Co levels and WC grain size.

Whereas particular embodiments of this invention have been described above for purposes of illustration, it will be evident to those skilled in the art that numerous variations of the details of the present invention may be made without departing from the invention as defined in the appended claims.

The invention claimed is:

1. A method of producing substantially spherical tungsten carbide particles comprising:
    coating a starting powder comprising separate non-spherical stoichiometric WC particles with a carbon-containing compound; and
    heating the coated stoichiometric WC particles in the presence of a plasma to produce the substantially spherical tungsten carbide particles.

2. The method of claim 1, wherein the substantially spherical tungsten carbide particles are non-stoichiometric.

3. The method of claim 1, wherein the substantially spherical tungsten carbide particles comprise WC$_{1-x}$, wherein x ranges from 0.001 to 0.25.

4. The method of claim 3, wherein x is less than 0.15.

5. The method of claim 1, wherein the substantially spherical tungsten carbide particles have an average aspect ratio of less than 2:1.

6. The method of claim 1, wherein the carbon-containing compound comprises wax.

7. A method of producing substantially spherical tungsten carbide particles comprising:
    heating non-spherical tungsten carbide particles coated with a carbon-containing compound in a plasma containing chamber to produce the substantially spherical tungsten carbide particles.

8. The method of claim 7, wherein the substantially spherical tungsten carbide particles are non-stoichiometric.

9. The method of claim 7, wherein the substantially spherical tungsten carbide particles comprise WC$_{1-x}$, where x ranges from 0.001 to 0.25.

10. The method of claim 7, wherein x is less than 0.15.

11. The method of claim 7, wherein said carbon-containing compound comprises wax.

* * * * *